E. G. WHITMORE
Nov. 1, 1932. SPRAY COATING EXHAUST SYSTEM Re. 18,645
Original Filed April 7. 1927.
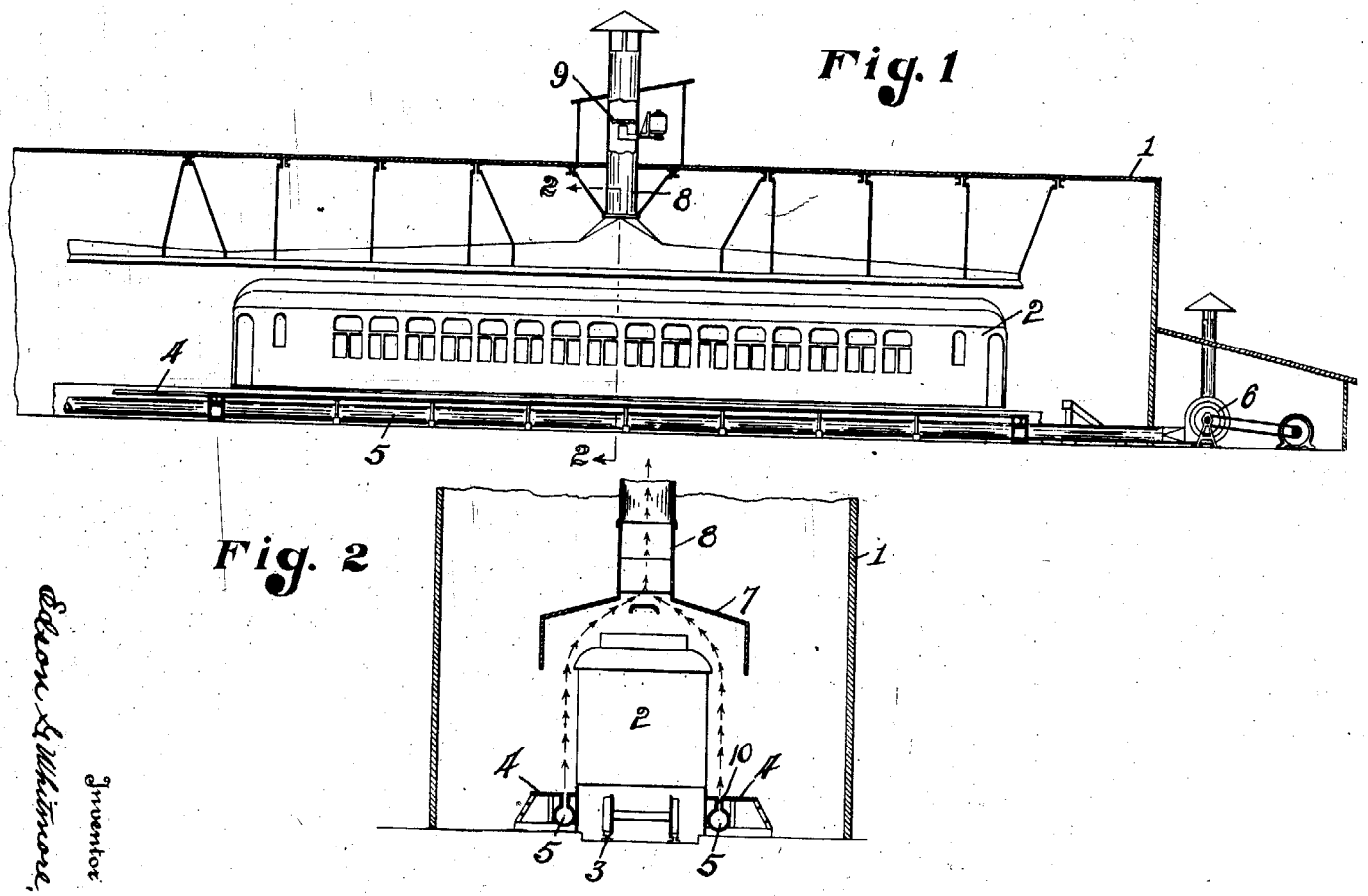
Inventor
Edson G. Whitmore,
By Owen & Owen,
Attorneys.

Reissued Nov. 1, 1932

Re. 18,645

UNITED STATES PATENT OFFICE

EDSON G. WHITMORE, OF TOLEDO, OHIO, ASSIGNOR TO THE DE VILBISS COMPANY, OF TOLEDO, OHIO, A CORPORATION OF OHIO

SPRAY COATING EXHAUST SYSTEM

Original No. 1,748,161, dated February 25, 1930, Serial No. 181,623, filed April 7, 1927. Application for reissue filed December 28, 1931. Serial No. 583,500.

This invention relates to the surface coating of portable objects by the spraying method.

In the application of surface coating materials by the spraying method, particularly where the work is performed indoors, it is important to make provision for protecting the operator from the spray dust and fumes arising from the spraying operation, which would otherwise be inhaled to a greater or less extent, depending on the particular job and the material being sprayed. These conditions are overcome in some cases by the operator wearing a mask somewhat similar to a gas mask, and with small portable work the spraying is usually in a booth through which an induced draft is set up to carry the fumes and spray dust from the operator. Such practice is not practicable, however, in the spraying of large objects, such, for instance, as railroad cars.

The object of this invention is the provision of a device for protecting the operator from the fumes and spray dust resulting from surface coating objects by spraying, and is particularly applicable to the spraying of large portable objects.

The invention is fully described in the following specification and illustrated in the accompanying drawing, in which—

Figure 1 is a fragmentary longitudinal section of a building or housing equipped for the use of my invention with a railway car in position therein to be surface coated; and Figure 2 is an enlarged fragmentary cross-section thereof on the line 2—2 in Fig. 1, with the car diagrammatically shown.

Referring to the drawing, 1 designates a shed or housing which may be of a length to receive one or more cars 2, or other objects to be spray-coated. The car, in the present instance, is run in on a track 3 disposed lengthwise within the housing and in spaced relation to both sides thereof. At each side of the car is disposed a platform 4 on which the operator may stand while spray-coating the adjacent side of the car. Beneath this platform is disposed a longitudinally extending manifold or conduit 5 having communication at one end with a source of air pressure supply, such, for instance, as a fan 6, whereby an induced draft may be set up through the conduit. This conduit has provision for discharging air therefrom in the form of a protecting pneumatic curtain up along the side of the car 2, but preferably in slightly spaced relation to such side, such air current entering a canopy 7 above the car and passing therefrom through an outlet flue 8 in which an induced current is set up by a fan 9 or other suitable means. The air, in the present instance, is shown as discharging from the conduits 5 through upwardly extending slit 10 therein which open through the platform 4.

Thus there is created a continuous upwardly moving pneumatic curtain at each side of the car as indicated by the arrows in Fig. 2. This in effect defines a spray fume exhaust chamber having two opposite portions, each portion having one wall formed by the railway car and the opposite wall formed by the pneumatic curtain, the end being open to the atmosphere.

The upward movement of such a curtain induces a like upward movement in the air adjacent to it. This surrounding air rises with the curtain and becomes combined with it. The spray fumes are dispersed not only throughout the air contained in the curtain, but throughout the air rising with the curtain. Hence the moving fume laden section of air has a greater width dimension than has the pneumatic curtain alone.

In order to receive all the spray fume laden air, it is advisable that the canopy extend beyond the side of the car being painted and the line of flow of the curtain for a substantial distance.

In order to exhaust the total amount of fume laden air the canopy exhaust pipe and fan means, necessarily, have an air volume capacity greater than that of the conduit 5 and the pressure fan supplying air for the curtain. The outlet flue 8, therefore, has a cross-section area considerably greater than that of the manifolds 5.

To minimize the amount of extraneous air drawn into the canopy by the suction of the exhaust fan it is desirable that the edges of the canopy 7 extending beyond the curtains have depending portions as shown in Figure 2.

Also, in the preferred construction as shown in Figure 2, a baffle 15 is disposed centrally beneath the inlet to the flue 8 and spaced from the wall of the canopy, so that the current through the flue is drawn from the sides of the canopy, thus facilitating the flow of the pneumatic curtains upwardly and along the walls of the canopy.

In the use of this protecting means, the operator stands outside of the protecting air curtain and discharges the spray stream therethrough against the surface to be coated, or preferably extends the discharge nozzle for the surface coating material substantially through the curtain of air, so that the spray stream emitted from the nozzle is not materially affected by the current of air passing between the operator and the object being coated. The air curtain is substantially parallel to the surface being coated or at an angle to the direction of discharge of the spraying material, so that any fumes or spray dust arising from the material being sprayed or rebounding from the surface of the object against which it strikes are picked up by the moving curtain of air and carried away from the operator.

I wish it understood that my invention is not limited to any specific construction, arrangement or form of the parts, or to the particular method described, as they are capable of numerous modifications and changes without departing from the spirit of the claims.

Having thus described my invention, what I claim as new and desire to secure by Letters Patent is:

1. A protective device for use in spray coating an object, comprising a support adapted to extend about the object to be coated near the base thereof for supporting the operator, an air supply conduit having a slit opening upwardly from the vicinity of said support in a plane substantially parallel to the surface of an object being coated and spaced therefrom to discharge a continuous upwardly moving pneumatic curtain, a canopy spaced above said support, overhanging the side of said object and having an outlet for receiving the flow of air from the pneumatic curtain, and means for creating said flow.

2. A protective device for use in spray coating an object, comprising a conduit having an outlet for discharging a thin upwardly flowing pneumatic curtain between the space where the operator stands and the surface to be coated and spaced from said surface, a canopy above said object and extending beyond the line of flow of said curtain, an outlet conduit leading from said canopy, and suction creating means to induce the flow from said curtain through said outlet conduit and to discharge it into the atmosphere away from the operator.

3. A device for protecting the spray operator when an object is being spray coated, comprising means for creating a continuous upwardly flowing pneumatic curtain spaced from the surface of the object being coated and substantially parallel thereto and between said surface and the operator, said means including an air supply conduit and manifold from which the curtain flows and means to supply air under pressure to said conduit and manifold, a canopy spaced from said manifold and extending across said curtain to receive the flow from said curtain, an outlet from said canopy, and means for inducing the flow through said outlet, said outlet having a flow materially larger than that of the supply conduit.

4. A protective device for use in spray coating an object, comprising means for directing air under pressure in a thin upwardly flowing and substantially continuous pneumatic curtain between the space where the operator stands and the surface being coated and spaced from said surface, a canopy in the path of said curtain above said object, said canopy being provided with a depending side outside of said pneumatic curtain and tending to prevent the induction of extraneous air into said curtain, a conduit leading from said canopy, and suction creating means to induce the flow from the curtain through said conduit and to discharge it into the atmosphere away from the operator.

5. A protective device for use in spray coating an object, comprising means for creating a thin upwardly flowing and substantially continuous pneumatic curtain between the space where the operator stands and the surface to be coated and spaced from said surface, a canopy in the path of said curtain above said object, said canopy being provided with a depending side outside of said pneumatic curtain and tending to prevent the induction of extraneous air into said curtain, and a discharge conduit leading from said canopy away from the operator and said object.

6. A protective device for use in spray coating an object, comprising means for directing air under pressure in a thin upwardly flowing and substantially continuous pneumatic curtain between the space where the operator stands and the surface to be coated and spaced from said surface, a canopy in the path of said curtain above said object, a conduit leading from said canopy, suction means in said conduit to induce the flow from the curtain through the conduit for discharge into the atmosphere away from the operator and a baffle disposed centrally beneath the inlet to said conduit and spaced from the wall of the canopy to cause the air current to flow along the walls of the canopy into said conduit.

7. A device for protecting the spray operator when an object is being spray-coated, comprising means for creating a continuously flowing pneumatic curtain spaced from the surface of the object being coated and located between said surface and the operator, said means including an air supply manifold from which the curtain flows and means to supply air under pressure to said manifold, an exhaust conduit having a receiving mouth opposed to and spaced from said manifold in the direction of discharge of the curtain and adapted to receive the flow from the curtain, and means separate from the air pressure supply means to induce the flow into and through said exhaust conduit.

In testimony whereof, I have hereunto signed my name to this specification.

EDSON G. WHITMORE.